United States Patent [19]

Eisenkolb et al.

[11] Patent Number: 4,613,035
[45] Date of Patent: Sep. 23, 1986

[54] APPARATUS FOR REMOVING BULK MATERIAL FROM A DUMP

[75] Inventors: Klaus Eisenkolb, Linz; Franz Plochberger, Leonding; Johann Pühringer, Ottensheim, all of Austria

[73] Assignee: Voest-Alpine Aktiengesellschaft, Linz, Austria

[21] Appl. No.: 753,236

[22] Filed: Jul. 9, 1985

[30] Foreign Application Priority Data

Jul. 25, 1984 [AT] Austria ................... 2399/84

[51] Int. Cl.$^4$ ................... B65G 65/16; B65G 17/36
[52] U.S. Cl. ................... 198/509; 37/190
[58] Field of Search ............ 198/509, 701, 711, 307; 37/70, 189, 190

[56] References Cited

U.S. PATENT DOCUMENTS

| 348,376 | 8/1886 | Boschke | 37/70 |
| 2,834,128 | 5/1958 | Kolbe | 198/509 X |
| 3,831,735 | 8/1974 | Canella | 198/509 |

FOREIGN PATENT DOCUMENTS

| 291852 | 11/1970 | Austria . | |
| 589504 | 11/1933 | Fed. Rep. of Germany | 37/190 |
| 1105807 | 4/1961 | Fed. Rep. of Germany | 37/190 |
| 1229912 | 12/1966 | Fed. Rep. of Germany . | |
| 522149 | 7/1921 | France | 37/190 |
| 152383 | 11/1981 | German Democratic Rep. | 37/190 |
| 751927 | 7/1956 | United Kingdom | 37/190 |
| 370324 | 4/1973 | U.S.S.R. | 37/190 |
| 825778 | 4/1981 | U.S.S.R. | 37/189 |

Primary Examiner—Joseph E. Valenza
Assistant Examiner—Michael Stone
Attorney, Agent, or Firm—Kurt Kelman

[57] ABSTRACT

Apparatus for removing bulk material from a dump comprises a horizontal scooping tube, which is mounted for rotation about its axis and provided with a plurality of buckets, which are distributed around the periphery and over the length of the scooping tube and protrude into the interior of the scooping tube through entrance openings formed in the wall of the scooping tube, and a conveyor, which extends within the scooping tube and serves to receive bulk material which has been dropped through the entrance openings by the buckets. In order to provide good conditions for the removal of material and to provide a simplified structure, the buckets are secured to annular collars, which are disposed at the entrance openings in the tube wall and radially outwardly protrude from the tube wall, and the buckets protrude at least with their backs through the collars into the interior of the scooping tube.

5 Claims, 3 Drawing Figures

APPARATUS FOR REMOVING BULK MATERIAL FROM A DUMP

BACKGROUND OF THE INVENTION

1. Field of the Invention

This invention relates to apparatus for removing bulk material from a dump, comprising a horizontal scooping tube, which is mounted for rotation about its axis and provided with a plurality of buckets, which are distributed around the periphery and over the length of the scooping tube and protrude into the interior of the scooping tube through entrance openings formed in the wall of the scooping tube, and a conveyor, which extends within the scooping tube and serves to receive bulk material which has been dropped through the entrance openings by the buckets.

2. Description of the Prior Art

Scooping tubes of that kind have been disclosed in German Patent Publication No. 1,229,912 and compared with other apparatus for removing bulk material afford the advantage that material can be removed from a dump of bulk material throughout the width of the dump at the same time and the bulk material discharged from the scooping tube will be throughly mixed. In order to ensure that the bulk material which has been removed from the dump can be reliably delivered to the conveyor within the scooping tube, the side walls of the buckets and their rear wall, which connects said side walls, protrude into the interior of the scooping tube and the discharge edge of each bucket is in pressure contact with a guide wall so that any bulk material which falls prematurely from the buckets into the interior of the scooping tube will be pushed by the back of the bucket along the guide wall to the conveyor. Those portions of the bucket which protrude into the interior of the scooping tube consist of elastic material so that a sealing engagement between said portions and the guide wall can be ensured and the separation of the bulk material from the bucket walls will be assisted by wall movements. A main disadvantage of such apparatus for removing bulk material resides in that the scooping forces which can be transmitted from the buckets to the scooping tube to which said buckets are connected by screws are restricted because excessively high loads would otherwise be applied in local regions.

In order to permit a taking up of relatively large scooping forces, stiffening means are provided within the scooping tube. But such scooping tube will promote an accumulation of bulk material which has been removed and which when dropped from the entrance openings is not received by the conveyor but elsewhere in the interior of the scooping tube. In order to avoid that disadvantage a scooping tube has been disclosed in Austrian Patent Specification No. 291,852 which comprises an outer shell and an inner shell, which is coaxially arranged in and spaced from the outer shell. Because the required stiffeners can be disposed between the two shells of the scooping tube and the entrance openings are constituted by ducts, which connect the two shells, the bulk material which has been removed can drop only into the interior of the inner shell, which surrounds a space that is enclosed by a smooth surface and does not permit an accumulation of material. A disadvantage of those known scooping tubes resides in that the provision of two shells substantially increases the structural expenditure and the buckets cannot be mounted at any desired locations because stiffening means are provided between the two shells and ducts must be provided between the two shells. Besides, the ducts joining the buckets are subjected to a relatively large wear.

SUMMARY OF THE INVENTION

It is an object of the invention to eliminate these disadvantages and so to improve apparatus which serves to remove bulk material from a dump that simple structural means ensure that even substantial scooping forces will be reliably taken up by the wall of the tube whereas it is not necessary to provide stiffening means on the inside surface of the scooping tube. Besides, the buckets, which are subjected to wear, should easily be detachable.

This object is accomplished in accordance with the invention in that the buckets are secured to annular collars, which are disposed at the entrance openings in the tube wall and radially outwardly protrude from the tube wall, and the buckets protrude at least with their backs through the collars into the interior of the scooping tube.

Because the buckets are secured to collars, the tube is adequately stiffened at least in the region which is most highly loaded by the scooping forces. As a result, there is no need for additional stiffening means and the scooping tube has a smooth inside surface but need not be double-walled. Because there are no other stiffening means, the collars can be mounted on the scooping tube at any desired locations. Besides, the collars radially protruding outwardly from the tube wall permit the buckets to be secured in a comparatively simple manner so that the replacement of the buckets will be facilitated. Because at least the backs of the buckets protrude through the collars and the entrance openings into the interior of the scooping tube, the collars are shielded by the backs of the buckets from the material which has been removed and are protected from being worn by said material. When an excessively high wear of the buckets is detected, it will be sufficient to replace the buckets; such replacement is simple because the buckets are secured to the collars.

A particularly simple structure will be obtained if, in accordance with a further feature of the invention, each bucket has an external annular flange, which is connected by screws to the end flange of one of the collars. The annular flange will not only stiffen the bucket but will permit a desirable transmission of force to the collar. Besides, the use of fixing screws ensures that the buckets can easily be replaced so that the scooping tube can be adapted for the removal of different bulk materials and can be rotated in two senses if the buckets are secured to the collars after a rotation through 180°.

The useful life of the buckets can be increased in that at least the back of each bucket, which back protrudes into the interior of the scooping tube, is provided on its inside surface with an elastic covering, which covers at least one through opening formed in the back of the bucket and preferably consists of a rubber sheet. The metallic back of the bucket, which back serves to guide the material that has been removed, will be protected by such elastic sheet not only against wear but also against corrosion. The elastic covering can bulge through the through opening formed in the back of the bucket so that an adhesion of the removed material to that covering will be opposed, and the material adhering to the covering can easily be removed by blows delivered to the covering through the through opening so that the material adhering to the covering will drop from the covering.

DETAILED DESCRIPTION OF THE PREFERRED EMBODIMENT

Figure 1:
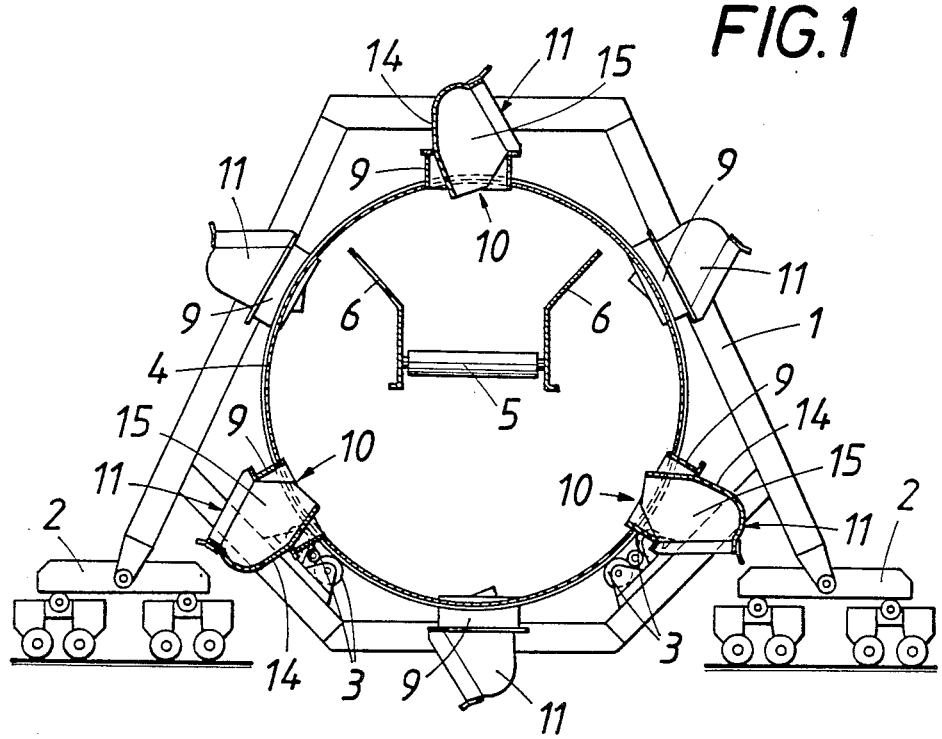
FIG. 1 is a simplified transverse sectional view showing an embodiment of apparatus according to the invention for removing bulk material from a dump.

An illustrative embodiment of the invention is diagrammatically shown on the drawing.

The apparatus which is shown in FIG. 1 and serves to remove bulk material from a dump comprises a frame 1, which is movable by means of trucks 2, and a scooping tube 4, which is rotatably mounted in the frame by means of rollers 3, which are adapted to be driven. The scooping tube 4 encloses a conveyor 5 for removing the bulk material, which has been dropped into the scooping tube 4. To ensure that the material which has been removed will be delivered to the conveyor 5, guide plates 6 are provided on the sides of the conveyor and flare like a funnel toward the upper scooping portion of the scooping tube 4.

Figure 3:
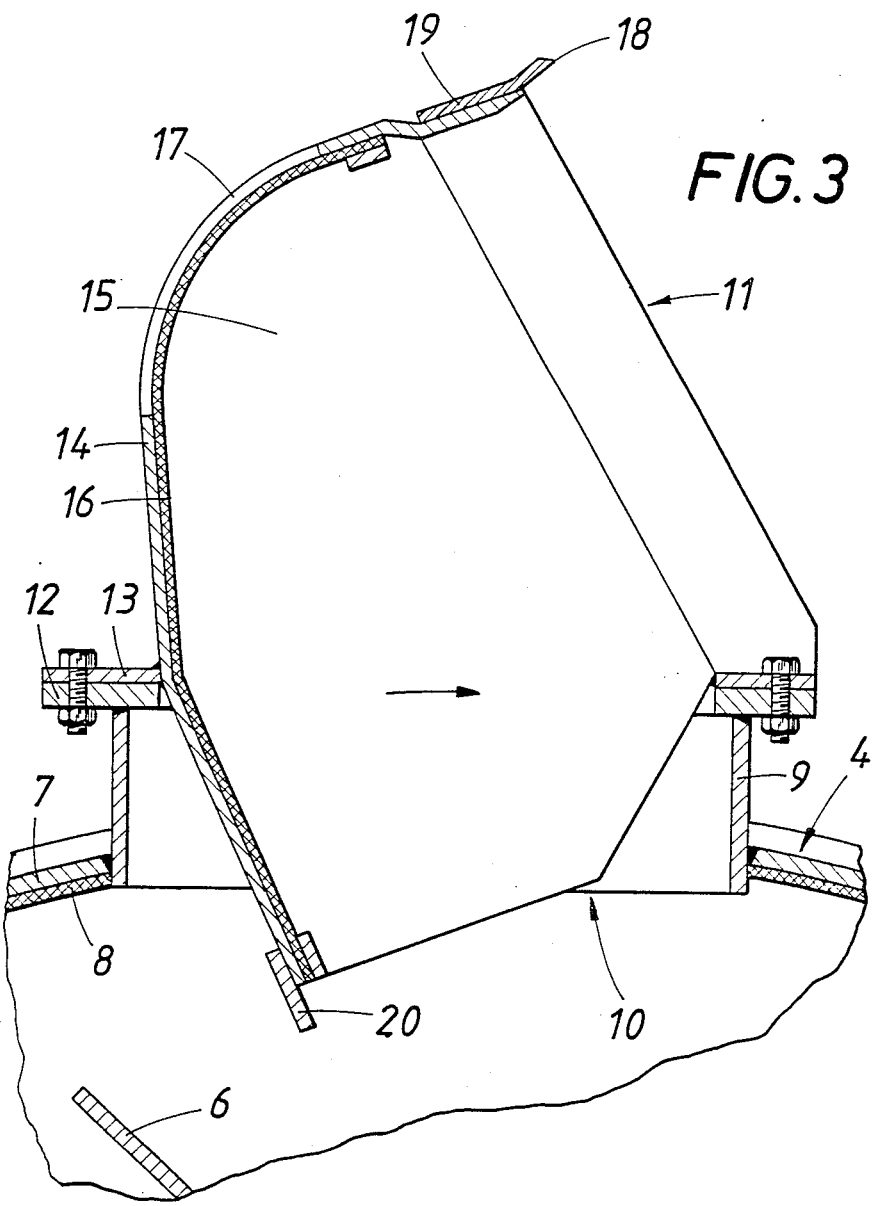

The scooping tube 4 consists of a tubular wall 7, which is covered on the inside with a covering 8 of rubberlike elasticity and carries annular collars 9, which radially protrude out of the wall 7 and which surround the entrance openings 10 and carry the brackets 11. Each bucket 11 is secured to an end flange 12 of the associated collar 9 by means of an annular flange 13, which is placed on the end flange 12 and secured to the latter by screws. The arrangement is such that the back 14 of each bucket 11 and its side walls 15 adjoining said back protrude through the collar 9 into the interior of the scooping tube 4 so that the material which has been received by the buckets and is raised during the rotation of the scooping tube will slide along the back 14 of the bucket toward the end of the bucket which protrudes into the interior of the tube and in the apex portion of the scooping tube 4 said material will be dropped through the entrance opening 10 onto the conveyor 5. Those portions of the buckets 11 which guide the removed material and which protrude into the interior of the scooping tube 4 will prevent a contact of the removal material with the collars, so that the collars 9, which are permanent parts of the scooping tube 4, will be protected from wear. Only the buckets 11 are subjected to wear by the material which has been removed but said buckets can easily be replaced. Besides, the buckets 11 can be protected from a direct wear by the provision of an elastic covering 16 at least on the back 14 of the buckets, as is shown in FIG. 3. The removed material might adhere to such covering in the buckets. But an adherence of removed material to the covering can be avoided to a high degree if the back 14 of the bucket is formed with through openings 17, which are covered by the covering 16 and provided particularly in endangered regions and permit the covering 16 to yield so that there will be a relative displacement of the covering 16 and the material adhering thereto and the adhering material will thus be detached. Besides, the covering can be properly cleaned in that blows are delivered to the covering 16 from the outside through the through openings 17.

Each bucket is provided at its leading edge with a cutting edge 18, which constitutes a wearing element that cannot be protected. But that cutting edge may be constituted by a replaceable wearing strip 19 so that the buckets 11 have a relatively large service life.

Adjacent to that end which protrudes into the interior of the scooping tube 4, the back 14 of the bucket may be provided with a scraper 20, which cooperates with the guide plates 6 of the conveyor 5 and prevents material dropped from the buckets 11 from entering the interior of the scooping tube 4 rather than falling on the conveyor 5.

Figure 2:
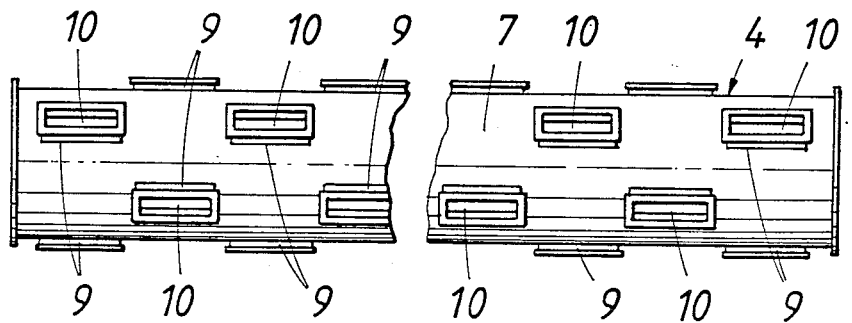
FIG. 2 is a side elevation showing on a smaller scale a scooping tube for such apparatus and FIG. 3 is an enlarged sectional view showing a bucket secured to a collar of the scooping tube.

By means of the collars 9 the wall 7 of the scooping tube 4 can be adequately stiffened so that there is no need for additional suffering means, the wall of the tube has a smooth inside surface, any removed material which has not fallen on the conveyor 5 cannot be retained on the inside surface of the tubular wall and said surface can easily be cleaned in case of need. Because the scooping tube 4 is stiffened only by the collars 9, the arrangement and distribution of the collars 9 can be freely selected. As a result, the collars and also the buckets can be provided in a staggered arrangement, as is shown in FIG. 2. That staggered arrangement will permit a more desirable distribution of the load so that smaller wall thicknesses may be selected for the tubular wall. The collars will also improve the strength of the tubular wall and will intensify the mixing of the removed material.

We claim:

1. In apparatus for removing bulk material from a dump, comprising
    a frame,
    a scooping tube having a horizontal axis and mounted in said frame for rotation about said axis and being formed with a plurality of entrance openings spaced apart in the peripheral and axial directions of said tube,
    drive means for rotating said tube about said axis,
    a plurality of buckets mounted on said tube and protruding out of said tube and into said tube through respective ones of said entrance openings and adapted to scoop material from said dump and to drop material from the apex of said tube into said tube during the rotation of said tube about said axis,
    a conveyor extending in said tube along the same and adapted to receive bulk material which has been dropped from said buckets into said tube,
    each of said buckets having a leading edge adapted to enter said dump during a rotation of said tube in a predetermined sense, and a back extending from said leading edge toward said tube and adapted to guide material in said bucket from said leading edge toward said tube,
    the improvement residing in that
    an annular collar is mounted on said tube at each of said entrance openings and protrudes radially outwardly from said tube,
    each of said buckets is secured to one of said annular collars and
    said back of each of said buckets extends through one of said collars and through one of said entrance openings and protrudes radially outwardly and radially inwardly from said collar.
2. The improvement set forth in claim 1, wherein each of said collars has a radial annular flange at its radially outer end and each of said buckets is provided with an external annular flange, which is secured by screws to said radial flange of one of said collars.

3. The improvement set forth in claim 1, wherein the back of each of said buckets is formed with a through opening disposed outside said tube and outside the associated collar and the back of each of said buckets is covered on its inside surface of an elastic covering, which covers also said through opening.

4. The improvements set forth in claim 3, wherein said covering consists of a rubber sheet.

5. The improvement set forth in claim 3, wherein each of said buckets has two side walls extending from opposite sides of said back and said elastic covering covers at least part of the inside surfaces of said side walls.

* * * * *